US012585005B2

(12) United States Patent
Chowdhury et al.

(10) Patent No.: US 12,585,005 B2
(45) Date of Patent: Mar. 24, 2026

(54) HYBRID METHOD FOR TIME-OF-ARRIVAL-BASED RANGING

(71) Applicant: ZaiNar, Inc., Redwood City, CA (US)

(72) Inventors: Mainak Chowdhury, Redwood City, CA (US); Philip A. Kratz, Redwood City, CA (US); Jonathan Shiao-En Lu, Redwood City, CA (US); Srdjan Miocinovic, Redwood City, CA (US); Siamak Yousefi, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 74 days.

(21) Appl. No.: 18/376,327

(22) Filed: Oct. 3, 2023

(65) Prior Publication Data

US 2024/0027596 A1     Jan. 25, 2024

Related U.S. Application Data

(63) Continuation of application No. 17/958,206, filed on Sep. 30, 2022, now Pat. No. 11,808,835, which is a continuation of application No. 17/511,433, filed on Oct. 26, 2021, now Pat. No. 11,493,619.

(60) Provisional application No. 63/105,822, filed on Oct. 26, 2020.

(51) Int. Cl.
G01S 13/08     (2006.01)
G01S 7/02     (2006.01)
G01S 7/03     (2006.01)
G01S 7/285     (2006.01)

(52) U.S. Cl.
CPC ............ G01S 13/08 (2013.01); G01S 7/0233 (2021.05); G01S 7/03 (2013.01); G01S 7/285 (2013.01)

(58) Field of Classification Search
None
See application file for complete search history.

(56) References Cited

U.S. PATENT DOCUMENTS

| | | | | |
|---|---|---|---|---|
| 7,057,556 B2 * | 6/2006 | Hall | .......................... | G01S 5/06 |
| | | | | 342/465 |
| 8,026,850 B2 * | 9/2011 | Seong | ....................... | G01S 5/14 |
| | | | | 342/387 |
| 9,194,936 B1 * | 11/2015 | Keegan | .................... | G01S 5/14 |

(Continued)

*Primary Examiner* — Bernarr E Gregory
(74) *Attorney, Agent, or Firm* — Run8 Patent Group, LLC; Peter Miller; Brian T. Chew

(57)     ABSTRACT

A method includes: receiving a ranging signal from the transmitter comprising a set of multiplexed sub-signals, each multiplexed sub-signal characterized by a frequency in a set of frequencies; calculating a time-based time-of-arrival estimate based on the series of time-domain samples of the ranging signal; calculating a time-based uncertainty of the time-based time-of-arrival; for each sub-signal pair in a subset of multiplexed sub-signals of the set of multiplexed sub-signals, extracting a phase difference of the sub-signal pair; calculating a phase-based time-of-arrival estimate based on the phase difference of each sub-signal pair in the subset of multiplexed sub-signals; calculating a phase-based uncertainty of the phase-based time-of-arrival estimate; and calculating a hybrid time-of-arrival estimate as a weighted combination of the time-based time-of-arrival estimate, the phase-based time-of-arrival estimate, based on the time-based uncertainty and the phase-based uncertainty.

20 Claims, 4 Drawing Sheets

(56) References Cited

U.S. PATENT DOCUMENTS

| | | | | |
|---|---|---|---|---|
| 11,493,619 | B2 * | 11/2022 | Chowdhury | ............ G01S 7/285 |
| 11,808,835 | B2 * | 11/2023 | Chowdhury | ............ G01S 7/285 |
| 2010/0240396 | A1 * | 9/2010 | Zhang | ........................ G01S 5/14 |
| | | | | 455/456.1 |
| 2010/0279707 | A1 * | 11/2010 | Fischer | ................. G01S 5/0226 |
| | | | | 455/67.11 |
| 2016/0011295 | A1 * | 1/2016 | Keegan | ..................... G01S 5/14 |
| | | | | 455/456.1 |

* cited by examiner

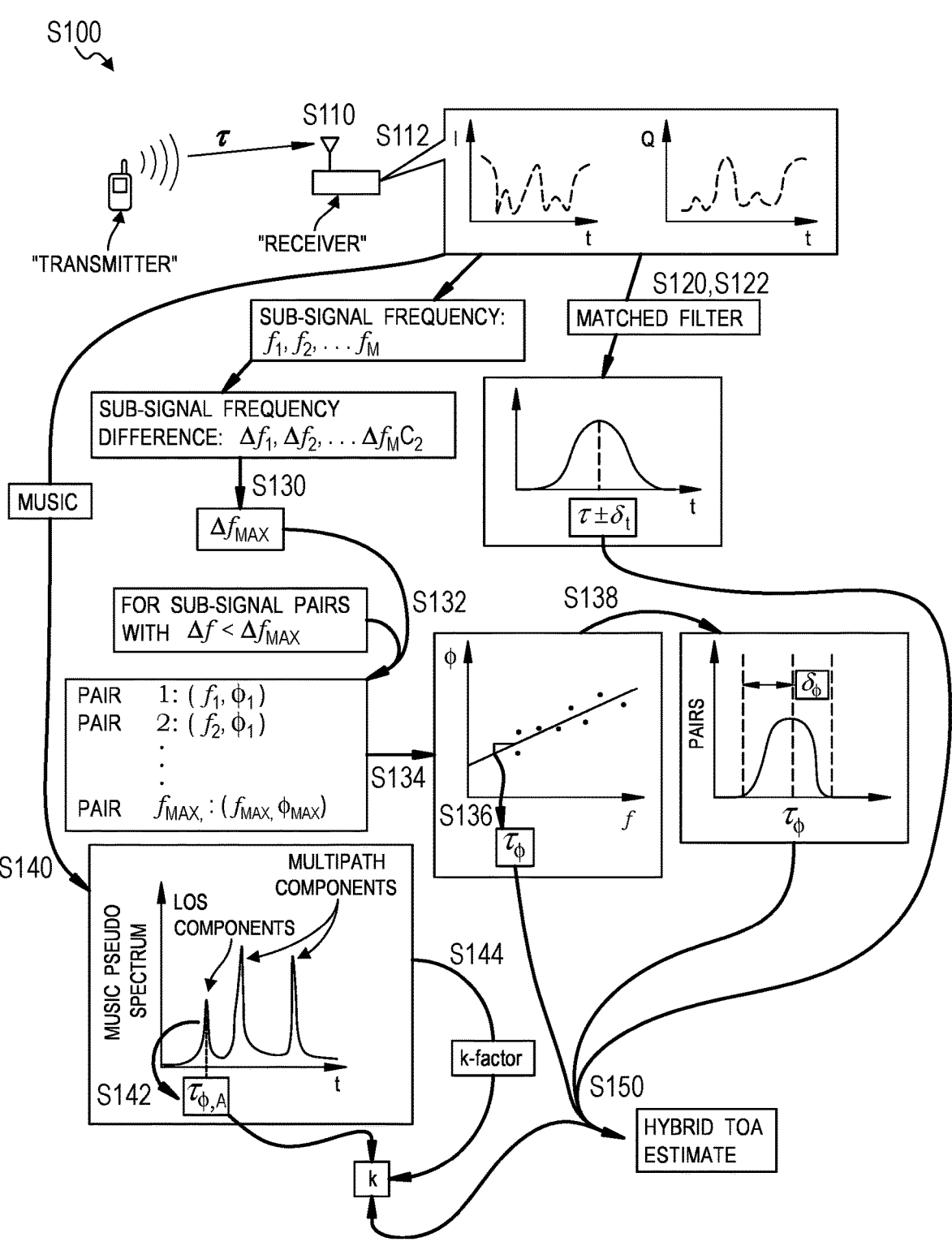
_FIG. 1_

S100

S100

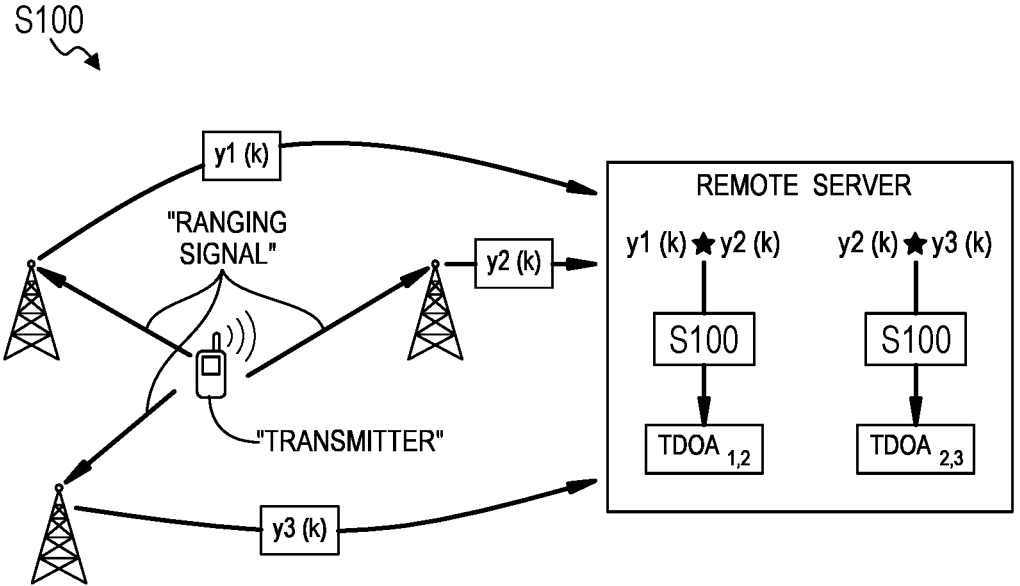
_FIG. 4_

HYBRID METHOD FOR TIME-OF-ARRIVAL-BASED RANGING

CROSS-REFERENCE TO RELATED APPLICATIONS

This Application is a continuation application of U.S. patent application Ser. No. 17/958,206, filed on 30 Sep. 2022, now U.S. Pat. No. 11,808,835; which is a continuation application of U.S. patent application Ser. No. 17/511,433 filed on 26 Oct. 2021, now U.S. Pat. No. 11,493,619; which claims the benefit of U.S. Provisional Application No. 63/105,822, filed on 26 Oct. 2020, each of which is incorporated in its entirety by this reference.

This Application is related to U.S. patent application Ser. No. 17/379,885, filed on 19 Jul. 2021, now U.S. Pat. No. 11,445,333; U.S. patent application Ser. No. 17/379,873, filed on 19 Jul. 2021, now U.S. Pat. No. 11,425,536; U.S. patent application Ser. No. 17/105,458, filed on 25 Nov. 2020, now U.S. Pat. No. 11,785,482; and U.S. patent application Ser. No. 16/846,030, filed on 10 Apr. 2020, now U.S. Pat. No. 11,722,979; each of which is incorporated in its entirety by this reference.

TECHNICAL FIELD

This invention relates generally to the field of time-of-arrival-based ranging and more specifically to a new and useful method for hybrid ranging in the field of time-of-arrival-based ranging.

BRIEF DESCRIPTION OF THE FIGURES

FIG. 1 is a flowchart representation of a method;

FIG. 4 is a flowchart representation of one variation of the method.

DESCRIPTION OF THE EMBODIMENTS

Figure 2:
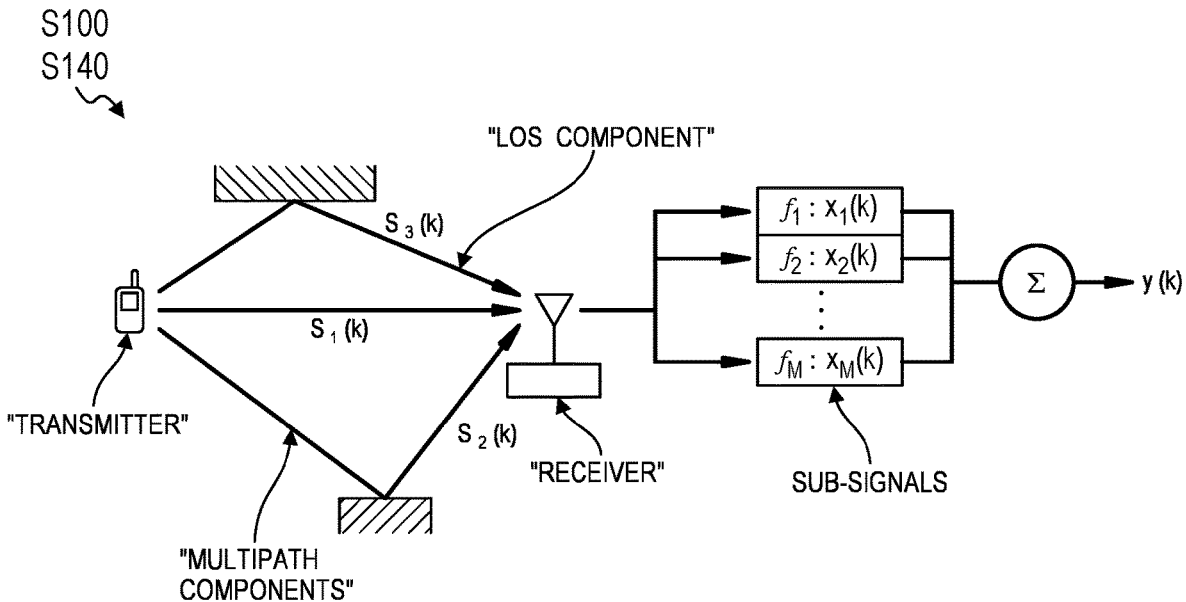
FIG. 2 is a flowchart representation of one variation of the method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIG. 1, a method for estimating a time-of-arrival of a ranging signal transmitted from a transmitter to a receiver comprising: accessing the ranging signal comprising a set of multiplexed sub-signals, each multiplexed sub-signal characterized by a frequency in a set of frequencies in Block S110; capturing a series of time-domain samples representing the ranging signal in Block S112; calculating a time-based time-of-arrival estimate based on the series of time-domain samples in Block S120; calculating a time-based uncertainty based on the sampling frequency of the receiver in Block S122; and calculating a maximum frequency difference in the set of frequencies characterized by a total phase accumulation of less than $2\pi$ radians during the time-based time-of-arrival estimate in Block S130. The method also includes, for each sub-signal pair in the set of sub-signal pairs characterized by a frequency difference less than the maximum frequency difference: extracting a phase difference of the sub-signal pair in Block S132; and calculating a sub-signal pair time-of-arrival estimate in a set of sub-signal time-of-arrival estimates based on the phase differences of the sub-signal pairs in Block S134. The method further includes: calculating a phase-based time-of-arrival estimate based on a measure of central tendency of the set of sub-signal pair time-of-arrival estimates in Block S136; calculating a phase-based uncertainty based on a variability measure of the set of sub-signal pair time-of-arrival estimates in Block S138; executing a multiple signal classification algorithm to detect a set of multipath components of the ranging signal in Block S140; calculating a phase-amplitude-based time-of-arrival estimate based on the set of multipath components of the ranging signal in Block S142; calculating a K-factor based on a power ratio of an earliest-arriving component to all other components in the set of multipath components in Block S144; and calculating a hybrid time-of-arrival estimate as a weighted combination of the time-based time-of-arrival estimate, the phase-based time-of-arrival estimate, and the phase-amplitude-based time-of-arrival estimate based on the time-based uncertainty, the phase-based uncertainty, and the K-factor in Block S150.

One variation of the method S100 includes: at a receiver, receiving the ranging signal from the transmitter, the ranging signal including a set of multiplexed sub-signals, each multiplexed sub-signal characterized by a frequency in a set of frequencies in Block S110; capturing a series of time-domain samples representing the ranging signal in Block S112; calculating a time-based time-of-arrival estimate based on the series of time-domain samples in Block S120; calculating a time-based uncertainty of the time-based time-of-arrival estimate based on the sampling frequency of the receiver in Block S122; for each sub-signal pair in a subset of multiplexed sub-signals of the set of multiplexed sub-signals, extracting a phase difference of the sub-signal pair in Block S132; calculating a phase-based time-of-arrival estimate based on the phase difference of each sub-signal pair in the subset of multiplexed sub-signals in Block S136; calculating a phase-based uncertainty of the phase-based time-of-arrival estimate based on a variability measure based on the phase difference of each sub-signal pair in the subset of multiplexed sub-signals in Block S138; and calculating a hybrid time-of-arrival estimate as a weighted combination of the time-based time-of-arrival estimate, the phase-based time-of-arrival estimate, based on the time-based uncertainty and the phase-based uncertainty, in Block S150.

Another variation of the method S100 includes: at the receiver, receiving the ranging signal from the transmitter, the ranging signal including a set of multiplexed sub-signals, each multiplexed sub-signal characterized by a frequency in a set of frequencies in Block S110; capturing a series of time-domain samples representing the ranging signal in Block S112; calculating a time-based time-of-arrival estimate based on the series of time-domain samples in Block S120; calculating a time-based uncertainty based on the sampling frequency of the receiver in Block S122; executing a multiple signal classification algorithm to detect a set of multipath components of the ranging signal in Block S140; calculating a phase-amplitude-based time-of-arrival estimate based on the set of multipath components of the ranging signal in Block S142; calculating a K-factor based on a power ratio of an earliest-arriving component to all other components in the set of multipath components in Block S144; and calculating a hybrid time-of-arrival estimate as a weighted combination of the time-based time-of-arrival estimate and the phase-amplitude-based time-of-arrival estimate based on the time-based uncertainty and the K-factor in Block S150.

Yet another variation of the method S100 includes: accessing a ranging signal transmitted by a transmitter and received by a receiver, the ranging signal including a set of multiplexed sub-signals, each multiplexed sub-signal characterized by a frequency in a set of frequencies in Block S110; for each sub-signal pair in a subset of multiplexed sub-signals of the set of multiplexed sub-signals, extracting a phase difference of the sub-signal pair in Block S132; calculating a phase-based time-of-arrival estimate based on the phase difference of each sub-signal pair in the subset of multiplexed sub-signals in Block S136; calculating a phase-based uncertainty of the phase-based time-of-arrival estimate based on a variability measure based on the phase difference of each sub-signal pair in the subset of multiplexed sub-signals in Block S138; executing a multiple signal classification algorithm to detect a set of multipath components of the ranging signal in Block S140; calculating a phase-amplitude-based time-of-arrival estimate based on the set of multipath components of the ranging signal in Block S142; and calculating a K-factor based on a power ratio of an earliest-arriving component to all other components in the set of multipath components in Block S144; and calculating the hybrid time-of-arrival estimate as a weighted combination of the phase-based time-of-arrival estimate and the phase-amplitude-based time-of-arrival estimate based on the phase-based uncertainty and the K-factor in Block S150.

2. Applications

As shown in FIG. 1, the method S100 is executed by a system including a receiver (or transceiver) and/or a remote server in order to estimate a time-of-arrival (hereinafter "TOA") of a ranging signal transmitted by a transmitter (or transmitting device) for the purpose of accurate ranging and localization. More specifically, the system can: receive a ranging signal including a set of multiplexed sub-signals each characterized by a unique frequency (e.g., subcarrier frequency or carrier frequency); execute a time-based TOA estimation process, a phase-based TOA estimation process, and a phase-amplitude based TOA estimation process all based on the ranging signal; and combine the results of these processes based on parameters derived from these processes that characterize the propagation channel between the receiver and the transmitter. Thus, the system can mitigate inaccuracies inherent to any one of these processes and consistently calculate accurate TOA estimates independent of the local multipath channel, hardware inadequacies (e.g., frequency-dependent amplitude), or software inadequacies at the receiver or transmitter.

Upon receiving a ranging signal from the transmitter, the system can capture (i.e., measure and/or record) a series of time domain samples representing the ranging signal and can calculate a time-based TOA estimate for the ranging signal based on these samples, such as via a matched filter. However, the time-based TOA estimate is limited in accuracy by the sampling frequency of the system and the effects of multipath fading on the ranging signal. Thus, the system can supplement the time-based estimate with additional estimates based on other characteristics of the ranging signal in order to improve the time-based estimate and arrive at a hybrid TOA estimate with greater accuracy.

In addition to capturing the series of time domain samples representing the ranging signal, the system can additionally extract the phase (e.g., the phase of arrival at the receiver) of each sub-signal in the set of sub-signals comprising the ranging signal. The system can then calculate a phase-based TOA estimate based on the extracted phase of each sub-signal of the ranging signal. While the system can calculate a phase-based TOA estimate that may be robust to hardware-dependent amplitude variations, the phase-based TOA may still be affected by strong multipaths, which may manifest as an unpredictable frequency-dependent phase delay across the set of sub-signal phases. Thus, the system can use a third TOA estimate as a cross-reference for the time-based TOA estimate and the phase-based TOA estimate.

In addition to extracting the phase of each sub-signal, the system can utilize both the phase of each sub-signal as well as the amplitude of each sub-signal in order to calculate a phase-amplitude-based TOA estimate. For example, the system can execute a multiple signal classification algorithm (hereinafter "MUSIC algorithm"), whereby the system can identify a TOA associated with each multipath component of the ranging signal as well as a power associated with each multipath component by calculating eigenvectors of the autocorrelation matrix of the ranging signal. The system can then calculate a phase-amplitude TOA by selecting the earliest identified TOA as the line-of-sight (hereinafter "LOS") TOA. Although the system can calculate a phase-amplitude TOA estimate that may remain accurate in a strong multipath environment, the phase-amplitude TOA estimate may be sensitive to hardware imperfections including non-linearities or uncalibrated non-reciprocities in the transmit-receive chains, which violate the assumptions of the MUSIC algorithm, and/or low peak-to-average power ratio of the ranging signal. However, in addition to extracting a third estimate for the TOA of the ranging signal, the system can utilize the MUSIC algorithm and/or other phase-amplitude-based TOA estimation methods (e.g., an ordinary beam-forming algorithm, Capon's beam-forming algorithm, and estimation of signal parameters via rotational invariance techniques or ESPRIT) to characterize the multipath environment of the ranging signal (e.g., by calculating multipath metrics of the ranging signal based on the identified multipath components of the ranging signal).

The system can then combine the time-based TOA estimate, the phase-based TOA estimate, and the phase-amplitude-based TOA estimate based on the characterization of the multipath environment as well as the time-based uncertainty and the phase-based uncertainty of the time-based TOA estimate and the phase-based TOA estimate respectively. Thus, the system can calculate a hybrid TOA estimate that improves accuracy in the face of multipath and hardware non-linearities without necessitating an increase in the sampling rate of the receiver or the bandwidth of the ranging signal.

3. Network

Figure 3A:
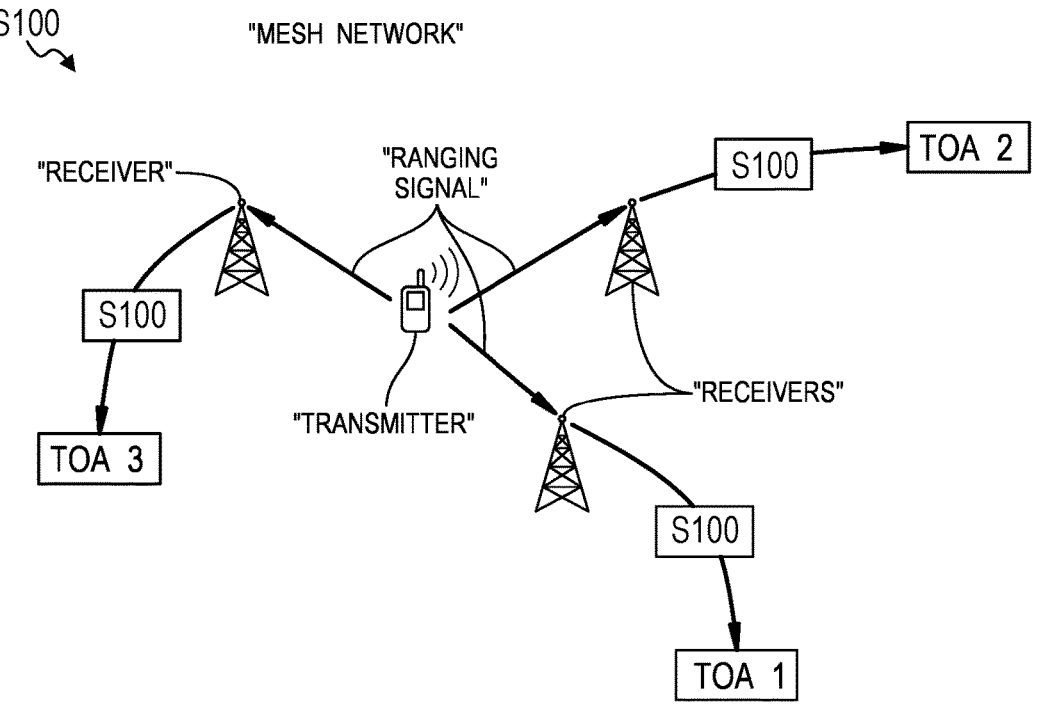
FIG. 3A is a flowchart representation of one variation of the method.
Figure 3B:
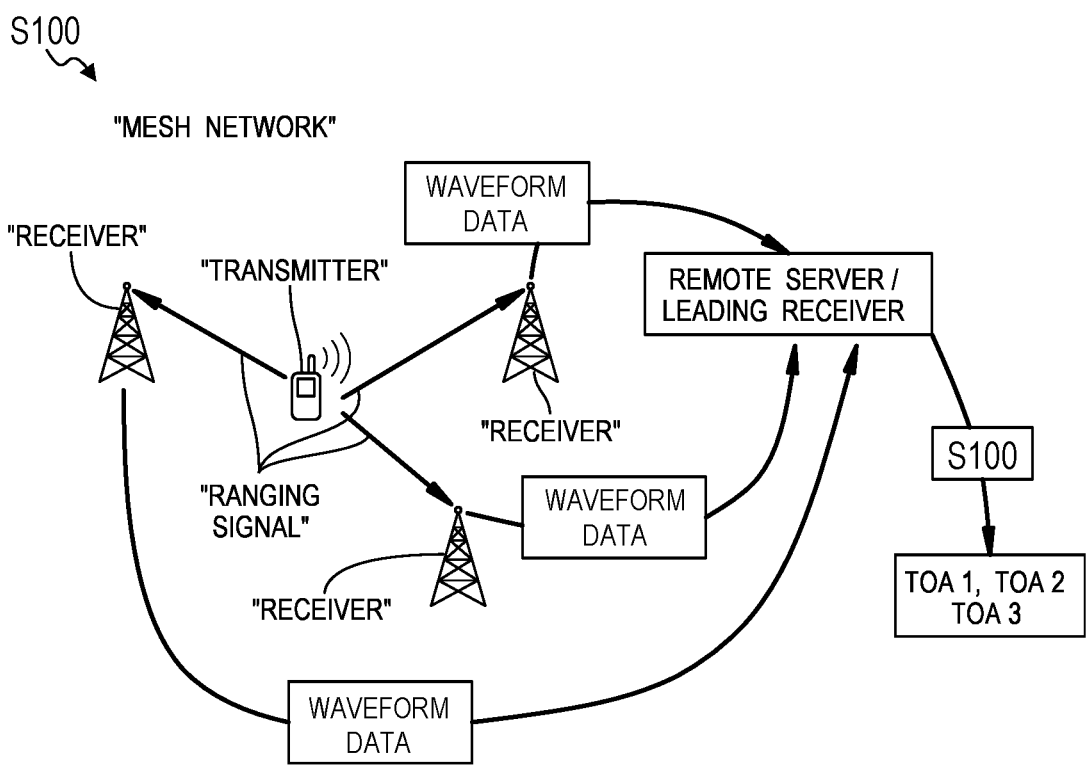
FIG. 3B is a flowchart representation of one variation of the method.

Generally, the method S100 is executed in the context of a wired or wireless communication network—such as the mesh network described in U.S. patent application Ser. No. 17/105,458, filed on Nov. 25, 2020, now U.S. Pat. No. 11,785,482. The mesh network can include a set of transceivers (e.g., custom wireless tag readers, 5G gNodeBs, 4G-LTE eNodeBs) configured to receive ranging signals from other transceivers participating in the mesh network or from transmitters (e.g., passive or active tags, 5G or 4G-LTE user equipment) and/or execute Blocks of the method S100. Upon receiving a ranging signal, a transceiver can execute Blocks of the method S100 locally, as shown in FIG. 3A, or can instead transmit raw waveform data or some intermediate output of the method S100 to a remote server or leading transceiver for further processing according to Blocks of the method S100, as shown in FIG. 3B. Thus, the system can execute Blocks of the method S100 at transceivers within a mesh network or at a central computational device (i.e., a remote server or leading transceiver) that may track other parameters characterizing the mesh network (e.g., the relative location and time biases of each transceiver in the mesh network).

In one implementation, transceivers in the mesh network self-localize by executing Blocks of the method S100 with respect to ranging signals transmitted from transceiver to transceiver in the mesh network. More specifically, by executing the method S100 in order to obtain accurate time-of-flight measurements between transceivers on a pairwise basis, the system can calculate distances for pairwise ranging of a transceivers pair and, assuming sufficient connectivity between transceivers in the mesh network, estimate the relative locations of each transceiver in the mesh network. Additionally or alternatively, the system can execute Blocks of the method S100 with respect to ranging signals sent from a transmitter (e.g., a passive or active tag, 5G or 4G-LTE, user equipment) to a transceiver, as part of an uplink localization protocol. Thus, by executing multiple instances of the method S100 for a ranging signal sent from a transmitter and received by multiple transceivers, the system can calculate accurate TOFs for the ranging signal at each transceiver in the mesh network and can execute TOA or TDOA multilateration to estimate a location of the transmitter.

Figure 3C:
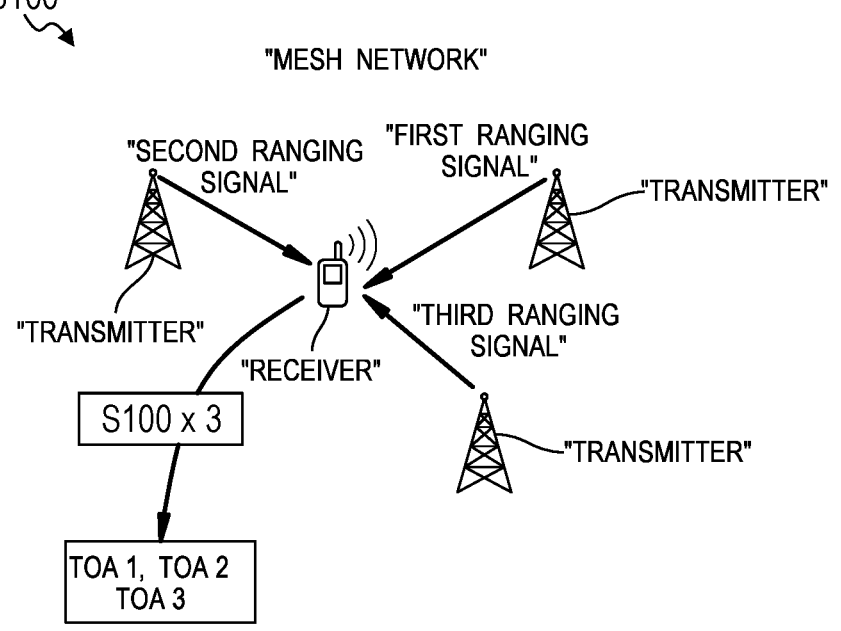
FIG. 3C is a flowchart representation of one variation of the method.

In another implementation, shown in FIG. 3C, Blocks of the method S100 are executed by a receiver of multiple ranging signals in a downlink localization protocol. In this implementation, a single receiver (e.g., 5G or 4G-LTE) executes an instance of the method S100 for each ranging signal received by the receiver. The receiver can then estimate its location given a location of the transmitter of each received ranging signal.

Generally, the method S100 is described below with respect to a ranging signal transmitted by a transmitter and received by a transceiver. However, the receiver and transmitter described below may be deployed in any of the contexts described above. Additionally, Blocks of the method S100 can be executed by a receiver of a ranging signal, by a remote computational device, or by a combination of both.

3.1 Receiver

Generally, the system can include a receiver configured to receive ranging signals transmitted from a transmitter. More specifically, the receiver can include RF receiving components, such as an antenna, amplifiers, mixers, filters, an analog-to-digital converter (hereinafter "ADC"), and/or a digital signal processor (hereinafter "DSP") arranged in a superheterodyne, heterodyne, or homodyne architecture. In one implementation, the system can include a receiver such as a wireless base station or wireless node within a network (e.g., a 4G or 5G network). In this implementation, the system can time synchronize the receiver with other receivers in the network in order to improve localization of transmitters within range of multiple receivers.

In one implementation, such as in a downlink localization protocol context, or in a pairwise localization protocol context, the receiver is configured to execute Blocks of the method S100 to locally generate a hybrid TOA estimate. Alternatively, the receiver is configured to receive the ranging signal and transmit waveform data representing the ranging signal to a remote computational device executing the method S100.

3.2 Transmitter

Generally, the system can estimate TOAs of ranging signals transmitted from a transmitter to the receiver in order to calculate a time-of-flight (hereinafter "TOF") of the ranging signal and therefore a range between the transmitter and the receiver. More specifically, the transceiver can be any device (including another receiver within the network) capable of transmitting the ranging signal. In one implementation, the transmitter can be a user device within a network such as a smartphone, smartwatch, tablet computer, laptop computer, or any other network-capable computing device.

3.3 Remote Computational Device

In one implementation, a remote computational device in communication with the receiver is configured to execute Blocks of the method S100 in order to generate a hybrid TOA estimate. In this implementation, the remote computational device can be a cloud server connected to one or more receivers configured to receive a ranging signal from a transmitter. In this implementation, the remote computational device can execute any subset of the Blocks of the method S100 not executed by receivers.

4. Ranging Signal

Generally, the system executes Blocks of the method S100 in order to estimate the TOA of the ranging signal upon reception of the ranging signal by the receiver. In order for the system to estimate the TOA of the ranging signal, the system can receive a ranging signal including a set of multiplexed sub-signals, wherein each sub-signal is characterized by a unique carrier frequency in a set of carrier frequencies in Block S110. Thus, by receiving a multiplexed signal with multiple frequency components, the system can execute the phase-only and phase-amplitude processes in order to estimate the TOA of the ranging signal.

Additionally, in order to calculate a time-based TOA estimate, the system can capture a series of time-domain digital samples representing the ranging signal in Block S112. By capturing a series of samples representing the ranging signal, the system can calculate a more accurate time-based TOA estimate by executing matched filter techniques or other super-resolution techniques that are more effective with increased signal length and complexity.

4.1 Carrier Frequency Hopping Scheme

In one implementation, the system can receive a ranging signal including a set of time division multiplexed sub-signals each characterized by a unique carrier frequency (i.e., a carrier frequency hopping scheme). More specifically, in this implementation, the system can receive a frequency-hopping spread spectrum signal comprising the set of multiplexed sub-signals, each multiplexed sub-signal characterized by the frequency in the set of frequencies.

In this implementation, the transmitter can transmit time-division-multiplexed sub-signals in successive slots of a time-division multiplexing scheme in order to provide phase information across multiple frequencies. The system can receive each successive sub-signal during the corresponding slot and extract the timing and phase information from that signal. The transmitter can vary the carrier frequency of each successive sub-signal such that the frequencies characterizing the set of sub-signals spans the available bandwidth within the channel. The system can calculate the TOA of each sub-signal and the phase of each sub-signal. The system can then calculate an accurate TOF between the transmitter and receiver based on these TOAs and these phases extracted from the ranging signal.

The method by which the system can extract accurate phase and TOA from a time-division multiplexed signal is further described in U.S. patent application Ser. No. 16/846,030, filed on Apr. 10, 2020, now U.S. Pat. No. 11,722,979.

4.2 Subcarrier Signal Scheme

In another implementation, the system can receive a ranging signal including a set of frequency-division multiplexed (e.g., orthogonal frequency division multiplexed) sub-signals, each characterized by a unique subcarrier frequency. More specifically, the system can receive an orthogonal-frequency-division-multiplexed signal comprising the set of multiplexed sub-signals, each multiplexed sub-signal characterized by the frequency in the set of frequencies.

In this implementation, the system receives a single signal including multiple subcarrier signals and can extract a unique phase corresponding to each subcarrier frequency of the subcarrier signal. The system can then extract the phase information from each subcarrier according to methods described in U.S. Provisional Application No. 63/053,509 and calculate a single time-of-arrival of the ranging signal.

5. Time-Based Time-of-Arrival Estimation

Generally, upon receiving the ranging signal from the transmitter, the system can calculate a time-based TOA estimation, $\tau_t$, in Block S120 and a time-based uncertainty, $\delta_t$, based on the sampling frequency of the receiver in Block S122. More specifically, the system can directly calculate a TOA estimation based on time domain samples captured at the receiver. Upon calculating the time-based TOA estimation, the system can leverage precise time synchronization (or precise characterization of a time bias) between the receiver and the transmitter in order to estimate the TOF of the ranging signal and, therefore, the distance between the receiver and the transmitter.

The system can utilize time domain sampling, oversampling, and/or matched filter techniques to detect the time-of-arrival (or times-of-arrival in the case of a time-division multiplexed signal) of the ranging signal.

In one implementation, the system can utilize a matched filter to identify a TOA based on a set of discrete time domain samples. More specifically, the system can: access a template signal corresponding to the ranging signal; correlate the template signal with the series of time-domain samples to identify a correlation peak; and calculate the time-based time-of-arrival estimate based on the correlation peak.

Alternatively, the system can execute super-resolution methods, such as those described in U.S. patent application Ser. No. 16/846,030, filed on Apr. 10, 2020, now U.S. Pat. No. 11,722,979, to increase the accuracy and/or precision of calculated TOA of the ranging signal. Upon calculating the TOA of the ranging signal, the system can access the transmission time of the ranging signal (or each time-divided sub-signal of the ranging signal) in order to calculate a TOF or a set of TOFs of the ranging signal (assuming sufficient clock synchronization between the transmitter and the receiver, e.g., nanosecond level clock synchronization). For example, in applications in which the ranging signal is a frequency-division multiplexed signal, the system can subtract the transmission time of the ranging signal from the calculated TOA of the ranging signal to calculate a TOF estimate of the ranging signal. Alternatively, in applications in which the ranging signal is a time-division multiplexed signal, the system can average the differences between corresponding transmission times and TOAs of the set of sub-signals comprising the ranging signal.

5.1 Uncertainty Estimation

In addition to calculating a time-based TOA estimate, the system also calculates a time-based uncertainty (or confidence interval) for the TOA estimate. More specifically, the system can calculate a time-based uncertainty based on the sampling frequency of the receiver in Block S122. Thus, by calculating a time-based uncertainty, the system can weigh the time-based TOA estimate appropriately relative to the phase-based TOA estimate and the phase-amplitude-based TOA estimate.

In one implementation, the system can calculate a time-based uncertainty based on the peak width of a matched filter output for the ranging signal. More specifically, the system can: execute a matched filter on a set of time-domain samples of the ranging signal to calculate a matched filter output; calculate the peak width of the matched filter output; and calculate an uncertainty of the time-based TOA estimate based on the peak width of the matched filter output.

In another implementation, in applications in which the system does not execute super-resolution techniques, the system can set the time-based uncertainty to equal the sampling period of the receiver.

6. Phase Difference Extraction

Generally, the system can calculate a phase-based TOA estimate for the ranging signal at the receiver based on the phase difference for each sub-signal in the set of sub-signals. More specifically, instead of calculating the TOA, $\tau_\phi$, for the received multicarrier at receiving device, m, via a single phase measurement (e.g., via the equation $\tau_\phi = \phi/2\pi f$, the system can instead calculate $\tau_\phi$ based on any two phase differences from any pair of sub-signals corresponding to subcarrier frequencies $n_1$ and $n_2$ in the set of sub-signals, N, as follows:

$$\tau_\phi = \frac{\phi_{n_2} - \phi_{n_1}}{2\pi\left(f_{n_1} - f_{n_2}\right)} = \frac{\Delta\phi}{2\pi\Delta f}.$$

Thus, the system can calculate multiple estimates for $\tau_\phi$ based on the number of sub-signals in the set of sub-signals included in the ranging signal and can aggregate these estimates into a single phase-based TOA estimate, as described below.

7. Pair-Slope Time-of-Arrival Estimation

Generally, upon extracting the phase difference, $\Delta\phi$, and frequency difference, $\Delta f$, of each sub-signal pair in the set of sub-signal pairs of the ranging signal, the system can calculate a phase-based TOA estimate in Blocks S130, S132, S134, and S136. More specifically, the system can: calculate a maximum frequency difference, $\Delta f_{max}$, to determine a subset of the sub-signal pairs with which to calculate the phase-based TOA estimate in Block S130; and, for each sub-signal pair in this subset of sub-signal pairs, calculate a phase difference, $\Delta\phi$, of each sub-signal pair in Block S132, calculate a sub-signal TOA estimate in a set of sub-signal TOA estimates based on the phase difference corresponding to each sub-signal pair in Block S134, and calculate a phase-based TOA estimate based on a measure of central tendency of the set of sub-signal TOA estimates in Block S138. Thus, the system calculates a slope of a linear fit to the phase of each sub-signal against the corresponding set of sub-signal frequencies in order to identify a phase-based TOA estimate. Because the system does not consider sub-signal pairs characterized by frequencies differences that result in a phase difference accumulation of greater than $2\pi$ radians, the system can avoid the $2\pi$ wrap-around effect that may prevent the usage of phase differences in calculating a TOA estimate.

In one implementation, the system can select a set of frequencies for the set of sub-signals with a $\Delta f$ based on the estimated range between the transmitter and receiver. For example, in response to estimating a larger range between receiver and transmitter, the system can decrease $\Delta f$ for the set of frequencies to reduce the effects of phase wrap-around. Alternatively, in response to estimate a shorter range between receiver and transmitter, the system can increase $\Delta f$ for the set of frequencies to increase measurement resolution for TOA. Thus, the system can calculate a precise phase-based TOA estimate by evaluating both closely spaced (in frequency) sub-signal pairs and larger spaced sub-signal pairs.

In order to calculate a maximum frequency difference for the subset of sub-signal pairs characterized by a total phase difference accumulation of less than $2\pi$ radians during transmission of the ranging signal, in one implementation the system can solve the equation, $$\Delta f_{max} = \frac{1}{\tau_{max}},$$

wherein $\tau_{max}$ is a maximum considered propagation time between the transmitter and the receiver. In particular, the system can: estimate a time-of-flight estimate of the ranging signal; and identify the subset of multiplexed sub-signals in the set of multiplexed sub-signals, the subset of multiplexed sub-signals characterized by a subset of frequencies in the set of frequencies, each frequency in the subset of frequencies defining a total phase accumulation of less than $2\pi$ radians for a duration of the time-of-flight estimate in Block S130. Thus, for any sub-signal pairs characterized by frequency differences less than the maximum frequency difference, the system predicts less than one cycle to occur during the TOF of the ranging signal. Additionally or alternatively, the system can calculate a rough TOF based on previous ranging calculations between the transmitter and the receiver, base station search area constraints, and/or signal strength measurements. In another implementation, the system can select sub-signal pairs characterized by frequencies less the $\Delta f_{max}$ by greater than a buffer frequency to provide a margin for the wrap-around frequency difference.

Once the system has isolated a subset of sub-signal pairs characterized by a frequency difference less than the maximum frequency difference, the system can generate a data pair representing the frequency difference, $\Delta f$, and phase difference, $\Delta \phi$, of each sub-signal pair in the subset of sub-signal pairs. In an ideal RF channel (with no noise, hardware impairments, or propagation-related multipath fading), the phase difference of each data pair directly corresponds to the propagation delay and/or physical the physical distance or electrical length between the transmitter and the receiver (assuming the system has successfully removed any sub-signals exhibiting greater than a $2\pi$ phase shift) and therefore the system can calculate the phase-based TOA estimate, $\tau_\phi$, by evaluating $$\tau_\phi = \frac{\Delta \phi}{2\pi \Delta f}$$

for any data pair ($\Delta f$, $\Delta \phi$). However, in a non-ideal RF channel, each data pair yields a different value for $\tau_\phi$. More specifically, the system can, for each sub-signal pair in the subset of multiplexed sub-signals: calculate a sub-signal pair time-of-arrival estimate based on the phase difference of the sub-signal pair in Block S134; calculate a phase-based time-of-arrival estimate based on a measure of central tendency of the sub-signal pair time-of-arrival estimate for each sub-signal pair in the subset of multiplexed signals. For example, the system can: calculate a value for $\tau_\phi$ for each data pair in the set of data pairs; and calculate a mean or median value for $\tau_\phi$ across data pairs, thereby calculating a phase-based TOA estimate.

Alternatively, instead of calculating a mean or median of values for $\tau_\phi$, the system can calculate a weighted average that weighs $\tau_\phi$ derived from data pairs characterized by larger values of $\Delta f$ to mitigate the effects of phase delay bias on the value of $\tau_\phi$.

7.1 Uncertainty Estimation

Generally, the system can also calculate a phase-based uncertainty, $\delta_\phi$, for the phase-based TOA estimate, $\tau_\phi$, in order to inform the calculation of the hybrid TOA estimate. More specifically, the system can calculate a phase-based uncertainty based on a variability measure of the set of sub-signal pair TOA estimates in Block S138. Thus, the system can apply weight to the phase-based TOA estimate based on the repeatability of the sub-signal pair TOA estimates when calculating the hybrid TOA estimate.

In one implementation, the system can calculate the phase-based uncertainty by calculating the standard deviation or the root mean square deviation of the value of T across the set of data pairs (i.e. a function of the residuals of each data pair). Thus, the system can calculate the phase-based uncertainty based on the distribution of the value of $\tau$ relative to the phase-based TOA estimate.

8. MUSIC Time-of-Arrival Estimation

Generally, the system can calculate a phase-amplitude TOA estimate, $\tau_{\phi,A}$, and identify a set of multipath components of the ranging signal. More specifically, the system can: execute a multiple signal classification algorithm to detect a set of multipath components of the ranging signal in Block S140; and calculate a phase-amplitude-based TOA estimate based on the set of multipath components of the ranging signal in Block S142. In particular, the system can calculate a third TOA estimate, further improving the hybrid TOA estimate and characterizing the multipath environment of the RF channel of the ranging signal.

In particular, the system can: generate a received ranging signal vector based on a series of digital samples representing each sub-signal in the set of sub-signals; calculate an autocorrelation matrix of the received ranging signal vector; for each frequency in the set of frequencies, calculate an eigenvector of the autocorrelation matrix and a corresponding eigenvalue of the autocorrelation matrix; sort the eigenvector for each frequency in the set of frequencies based on the corresponding eigenvalue for each frequency in the set of frequencies to identify a noise subspace of eigenvectors and a signal subspace of eigenvectors; evaluate an estimation function over a range of possible times-of-arrival based on the noise subspace of eigenvectors and a steering vector; and identify peaks of the estimation function as the set of multipath components of the ranging signal, each multipath component in the set of multipath components corresponding to a multipath time-of-arrival. This process is described in further detail below.

The system applies the MUSIC algorithm (often used for angle-of-arrival detection) to the TOA calculation and multipath characterization according to the receiver and signal model shown in FIG. 2. In FIG. 2: each multipath component of the signal is represented as $s_i(k)=\alpha_i(k)e^{j2\pi f\tau_i}$ with received TOAs $\tau_i$ for i∈{1, . . . , D}, wherein D represents the number of multipath components and k represents the digital sample of the ranging signal; the received ranging signal vector, x(k) is captured for M sub-signals with different frequencies and is represented as $\vec{x}(k)=[x_1(k), x_2(k), . . . , x_M(k)]^T$. Additionally, the system executes the MUSIC algorithm based on the steering matrix, A describing each multipath component with TOA $\tau$ in terms of a composition of sub-carrier signals:

$$A=[a(\tau_1),a(\tau_2), . . . ,a(\tau_D)],$$

wherein $a(\tau_i)=[1, e^{j2\pi\Delta f\tau_i}, . . . , e^{j2\pi(M-1)\Delta f\tau_i}]^T \in \mathfrak{R}^M$, and $\Delta f$ is the difference between two consecutive frequencies. Based on the above described receiver and signal model:

$$\vec{x}(k)=A(\tau)\ \vec{s}(k)+\vec{n}(k),$$

wherein $\vec{s}(k)=[\alpha_1(k)e^{j2\pi f_0\tau_1}, \alpha_2(k)e^{j2\pi f_0\tau_2}, . . . , \alpha_D(k)e^{j2\pi f_0\tau_D}]^T \in \mathfrak{R}^D$ represents the signal vector and $\vec{n}(k)$ represents the noise within each sub-signal of the ranging signal.

The system then computes the following autocorrelation matrix:

$$R_{xx}=E(\vec{x}\vec{x}^H),$$

wherein $\vec{x}^H$ represents the conjugate transpose of $\vec{x}$ and E represents an expected value function equivalent to a statistical average over the elements of its input.

Once the system has computed $R_{xx}$, the system calculates the eigenvectors $v_i\in \mathfrak{R}^M$ for i∈{1, . . . , M} and corresponding eigenvalues of $R_{xx}$ and sorts the eigenvectors in descending order of the corresponding eigenvalues. Based on an estimation of the number of multipath signals, the system then separates the eigenspace of $R_{xx}$ into a signal subspace $Q_s=[v_1, v_2, . . . , v_D]$ and a noise subspace, $Q_n=[v_{D+1}, v_{D+2}, . . . , v_M]$. Because steering vector $a(\tau)$ at the true multipath delays spans the signal subspace, it is orthogonal to the eigenvector in the noise subspace, i.e., $a(\tau)^H v_i=0$ for i∈{D+1, . . . , M}. Hence, by evaluating the MUSIC estimation function, $P_{MU}(\tau)$, over a range of discrete values of $\tau$, the system can generate a pseudospectrum, and identify the peaks in this spectrum as the TOAs of each multipath component of the signal, as follows:

$$P_{MU}(\tau) = \frac{1}{\sum_{i=p+1}^{M} |a(\tau_i)^H v_i|^2}$$

Upon generating the MUSIC pseudospectrum, the system can select an earliest multipath component in the set of multipath components based on the multipath time-of-arrival of each multipath component. More specifically, the system can then select the minimum TOA represented in the peaks of the pseudospectrum as the LOS TOA to calculate the phase-amplitude-based TOA estimate, $\tau_{\phi,A}$.

In applications in which the system executes time-difference-of-arrival localization (hereinafter "TDOA" localization) based on reception of the ranging signal by multiple receivers, the system can calculate the MUSIC estimation function $P_{MU}(\Delta\tau)$ based on the TDOA value instead of the TOA value. In this implementation, the system can filter the many peaks in the $P_{MU}(\Delta\tau)$ generated due to the various combinations of multipath components received at a pair of receivers and select those peaks closest to the phase-based TOA estimate, $\tau_\phi$. Alternatively, the system can apply a set of geometric conditions based on the multipath components generated via execution of the MUSIC algorithm to identify a TDOA estimate that best fits a known geometry of a mesh network of transceivers, as is further described below. Thus, the system can reject $\Delta\tau$ between multipath components measured at distinct receivers.

8.1 Multipath Severity Estimation

Generally, the system can calculate a parameter representing the severity of the multipath within the RF channel in order to inform the combination of TOA estimates when calculating the hybrid TOA estimate. More specifically, the system can calculate a multipath metric (e.g., a Rician K-factor, delay spread, and/or angle spread), in Block S144, that characterizes the severity of multipath within the ranging signal channel, such as by comparing a power of a line-of-sight component and power of the non-line-of-sight components in the set of multipath components. Thus, the system can weigh the contribution of the phase-based TOA estimate relative to the phase-amplitude-based TOA estimate when calculating a hybrid TOA estimate for the ranging signal.

In one implementation, the system calculates a Rician K-factor based on the eigenspace of the $R_{xx}$ matrix. Thus, the system can calculate a parameter that compares the relative power of the LOS multipath component with power of other multipath components of the system, thereby characterizing the multipath severity within the RF channel of the ranging signal.

9. Weighted Time-of-Arrival Estimation

Generally, the system can calculate a hybrid TOA estimate as a weighted combination of the time-based TOA estimate, the phase-based TOA estimate, and/or the phase-amplitude-based TOA estimate based on the time-based uncertainty, the phase-based uncertainty, and the multipath metric in Block S150. More specifically, the system can: calculate a weighted combination of the phase-based TOA estimate and the phase-amplitude based TOA estimate, wherein the system calculates the weights of the phase-based TOA estimate and the phase-amplitude-based TOA estimate based on a multipath metric; compare this weighted combination against the time-based TOA estimate and time-based uncertainty; and, in response to detecting that the weighted combination falls within the time-based uncertainty interval, select the weighted combination as the hybrid TOA estimate. Alternatively, in response to detecting that the weighted combination falls outside of the time-based uncertainty interval, the system can select the time-based TOA estimate as the TOA estimate. Thus, the system weights the combination of the phase-based TOA estimate and the phase-amplitude-based TOA estimate based on the system's characterization of the multipath environment.

Generally, the system calculates the weighted combination as a weighted average of the phase-based TOA estimate and the phase-amplitude-based TOA estimate, wherein the system decreases the weight of the phase-based TOA estimate relative to the phase-amplitude-based TOA estimate in response to detecting strong multipath components of the ranging signal (i.e., a lower value of the Rician K-factor multipath metric) and increases the weight of the phase-based TOA estimate relative to the phase-amplitude-based TOA estimate in response to detecting weak multipath components of the ranging signal (i.e., a higher value of the multipath metric). Thus, in view of a strong multipath environment, the system prioritizes the value of the phase-amplitude-based TOA estimate, which is more robust to multipath fading, and, in view of a weak multipath environment, the system prioritizes the value of the phase-based TOA estimate, which is more robust to modeling errors inherent in calibrating hardware imperfections (e.g., non-reciprocity and non-linearity).

Alternatively, the system can calculate the overall measurement uncertainty for the hybrid TOA estimate based on the value of the Rician K-factor. For example, a low value of the Rician K-factor may indicate a strong multipath environment, which may also reduce the accuracy of the time-based and phase-based TOA estimates. Thus, the system can increase the uncertainty of the hybrid TOA estimate based on the multipath environment characterized by the Rician K-factor.

In one implementation, the system can execute a binary decision tree based on a threshold value of the multipath metric (e.g., 10 dB for the Rician K-factor) to determine the weights for the phase-based TOA estimate and the phase-amplitude-based TOA estimate. In one example, in response to detecting that the multipath metric exceeds the threshold value, the system can set the weight for the phase-based TOA estimate to one and the phase-amplitude-based TOA estimate to zero, thereby setting the hybrid TOA estimate to equal the phase-based TOA estimate. In this example, in response to detecting that the Rician K-factor multipath metric does not exceed the threshold value, the system can set the weight for the phase-based TOA estimate to zero and the phase-amplitude-based TOA estimate to one.

In another implementation, the system: calculates weights for the phase-based TOA estimate and the phase-amplitude-based TOA estimate such that the weights are proportional or inversely proportional to the multipath metric respectively; and calculates a weighted average of the phase-based TOA estimate and the phase-amplitude-based TOA estimate based on the previously calculated weights. Thus, the system can include information from both the phase-based TOA estimate and the phase-amplitude-based TOA estimate in calculating the hybrid TOA estimate.

However, in applications in which, both the phase-based TOA estimate and the phase-amplitude-based TOA estimate are inaccurate, the system can detect these inaccuracies based on a comparison with the time-based TOA estimate. In one implementation, the system can calculate an upper bound of a time-based uncertainty interval and a lower bound of a time-based uncertainty interval by adding and subtracting the time-based uncertainty from the time-based TOA estimate respectively. The system can then detect whether the above-described weighted combination of the phase-based TOA estimate and the phase-amplitude-based TOA estimate falls within the calculated time-based uncertainty interval. If so, the system can select the weighted combination as the hybrid TOA estimate.

In yet another implementation, the system can calculate a weighted average of the time-based TOA estimate, the phase-based TOA estimate, and the phase-amplitude-based TOA estimate. In this implementation, the system calculates the weights for each TOA estimate based on the time-based uncertainty, the phase-based uncertainty, and the multipath metric respectively. Thus, the system can utilize three different TOA estimates in order to further improve the accuracy of the hybrid TOA estimate.

In yet another implementation, the system can: calculate a threshold interval based on the phase-based uncertainty; detect whether the phase-amplitude-based TOA estimate lies within the threshold interval of the phase-based TOA estimate; and, in response to detecting agreement between the phase-amplitude-based TOA estimate and the phase-based TOA estimate, calculate a hybrid TOA estimate equal to the phase-amplitude-based TOA estimate. If the system detects that the phase-amplitude-based TOA estimate falls outside of the threshold interval of the phase-based TOA estimate, the system can instead calculate a weighted average of the time-based TOA estimate, the phase-based TOA estimate, and/or the phase-amplitude based TOA estimate.

10. Ranging and Multilateration

In one implementation, upon calculating the hybrid TOA estimate, the system can calculate the range at which the transmitter transmitted the ranging signal (e.g., the distance between the transmitter and the receiver). More specifically, the system can access a time-of-departure of the ranging signal from the transmitter; access a relative time bias between the transmitter and the receiver; and calculate a hybrid range estimate for a distance between the transmitter and the receiver based on the hybrid time-of-arrival estimate, the time-of-departure of the ranging signal, and the relative time bias between the transmitter and the receiver.

In one implementation, the system can: calculate a TOF of the ranging signal and, therefore, a distance between the transmitter and the receiver by achieving precise clock synchronization between the receiver and the transmitter, compensating for latency introduced by the application specific signal processing circuit, and comparing the hybrid TOA estimate to a known transmission time at the transmitter. The system can then multiply the TOF of the ranging signal by the speed of the ranging signal (e.g., the speed of light, sound, or electrical propagation corresponding to the relevant medium). Thus, multiple receiver nodes in the network of nodes executing the method S100 based on the same ranging signal can each calculate a range between the receiver and the transmitter. The system can then input these distances and known locations of each receiver into a multilateration algorithm in order to localize the transmitter with a high degree of accuracy (e.g., within ten meters, within ten centimeters).

In one implementation, the system can instead include a single receiver receiving multiple ranging signals from multiple transmitters with known locations. In this implementation, the receiver can: execute the method S100 described above in order to calculate a hybrid TOA estimate for each ranging signal; calculate a distance between each transmitter and the receiver; and input these distances into a multilateration algorithm in order to localize the receiver relative to the transmitters with known locations.

11. TDOA and PDOA Ranging Variations

Alternatively, in applications in which the system cannot achieve precise clock synchronization between the transmitter and the receiver or in applications in which uncalibrated frequency dependent delays are present in the ranging signal, the system can execute time-difference-of-arrival (hereinafter "TDOA") localization and/or phase-difference-of-arrival (hereinafter "PDOA") to localize the transmitter more accurately.

In one variation, shown in FIG. 4, the system generates a time-based TDOA estimate based on cross-correlated ranging signal and/or a phase-amplitude-based TDOA estimate based on complex conjugate multiplication of the received complex signals at the correlation peaks of the two receivers and selects the compound multipath component closest to the phase-based TDOA estimate as a phase-amplitude-based TDOA estimate.

In another variation, upon executing the MUSIC algorithm on a ranging signal as described above, the system generates a MUSIC pseudospectrum for each receiver in a mesh network of receivers. The system can then calculate a hybrid TOA estimate by executing Blocks of the method S100 for each receiver in the mesh network. Subsequently, the system can access these hybrid TOA estimates from multiple receivers and calculate hybrid TDOAs for each pair of receivers by subtracting the hybrid TOA estimates of each pair of receivers. Upon generating a set of TDOAs for each pair of transceivers and given locations of each receiver in the mesh network, the system can execute a TDOA multilateration algorithm to calculate a location of the transmitter.

In a PDOA variation instead of calculating a TOA estimate at each receiver, the system can: access a POA of the ranging signal at each receiver in a pair of receivers in the mesh network of receivers (which may include a relative phase offset of the pair of receivers); calculate a PDOA based on the POA from the pair of receivers by subtracting a the relative phase offset of the pair of receivers; and estimate a TDOA via the MUSIC algorithm described above based on the calculated PDOA. However, in this variation, the earliest peak of the MUSIC pseudospectrum may not correspond to the LOS component of the ranging signal for either or both receivers in the pair of receivers, therefore, the system identifies the LOS TDOA from the MUSIC pseudo spectrum via other means described in further detail below.

In one example of the PDOA variation, the system can select a peak of the MUSIC pseudospectrum with the greatest amplitude as the LOS TDOA. In another example, using the complex phase and amplitudes of the ranging signal at a pair of receivers, the system can generate a MUSIC pseudospectrum including multiple peaks for each pair of receivers in the mesh network such that each peak corresponds to a TDOA estimate. Subsequently, the system can access a set of TDOAs (i.e., a set of three TDOAs) of the ranging signal at a set of three receivers based on combinations of peaks of the MUSIC pseudospectra (e.g., by selecting a combination of peaks from the MUSIC pseudospectrum of a first receiver and the peaks from the MUSIC pseudospectrum of a second receiver). For any set of three receivers the sum of the TDOAs of a closed graph of receivers may be equal to zero, assuming an ideal channel environment between the transmitter and the receivers (e.g., accurate TDOAs in the absence of noise). Thus, the system can calculate a sum of TDOAs and select the combination of multipath components of TDOAs with a sum closest to zero as the LOS TDOA estimates. Thus, in this variation, the system can utilize information from multiple receivers to identify LOS TDOAs for each pair of receivers in the mesh network. The system can repeat this process for each graph of three receivers receiving the ranging signal. Upon calculating LOS TDOAs for each pair of receivers in the mesh network by iterating through graphs of three receivers, the system can execute a TDOA multilateration algorithm to estimate the location of the transmitter relative to the mesh network of receivers.

In another implementation, the system can execute a geometric analysis of the location of the transmitter relative to the locations of the receivers for each combination of multipath components identified by the MUSIC algorithm. For example, the system can calculate a TDOA MUSIC pseudospectrum for a pair of receivers of the ranging signal based on a cross-correlation of the ranging signal received at each receiver in the pair of receivers; access known locations of the receivers in the pair of receivers or a distance between the receivers in the pair of receivers; select a TDOA candidate from the peaks of the TDOA MUSIC pseudospectrum; and calculate a 2D location estimate for the transmitter of the ranging signal based on the TDOA candidate. Upon calculating the 2D location estimate of the transmitter, the system can execute a geometric analysis to identify whether the location of the transmitter is consistent with previous known locations of the transmitter and/or known geometry or characteristics of the area encompassing the transmitter and receivers. In instances in which the system cannot resolve a 2D location estimate based on a TDOA candidate (e.g., instances in which the TDOA candidate implies a distance between receivers greater than the known distance between receivers) or instances in which the 2D location estimate is not consistent with known geometry of the area and/or prior known locations of the transmitter or receivers, the system can eliminate the TDOA candidate from a set of plausible TDOAs for the ranging signal. By repeating the steps above for each peak of the TDOA MUSIC pseudospectrum representing a TDOA candidate, the system can reduce the number of TDOA candidates and/or narrow the range of possible TDOA values.

In instances in which multipath components are present in the ranging signal transmitted between receivers (e.g., in a mesh network deployment), the system can also iterate through candidate ranges between receivers as well as iterating through TDOA candidates of the ranging signal received at each receiver in a pair of receivers. By evaluating each possible combination of TDOA candidate and range candidate for a pair of receivers, the system can eliminate combinations not consistent with known geometric relationships between the transmitter and the pair of receivers.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing a ranging signal transmitted from a transmitter and received at a receiver, the ranging signal comprising a set of multiplexed sub-signals characterized by a set of frequencies;
   generating a time-based representation of the ranging signal;
   calculating a first time-of-arrival estimate based on the time-based representation of the ranging signal;
   calculating a set of phase differences of sub-signal pairs in the set of multiplexed sub-signals;

calculating a second time-of-arrival estimate based on the set of phase differences of sub-signal pairs; and characterizing a hybrid time-of-arrival estimate of the ranging signal based on a combination of the first time-of-arrival estimate and the second time-of-arrival estimate.

2. The method of claim 1:

further comprising calculating a third time-of-arrival estimate based on a set of multipath components characteristic of the ranging signal; and wherein characterizing the hybrid time-of-arrival estimate comprises characterizing the hybrid time-of-arrival estimate based on a combination of:

the first time-of-arrival estimate;

the second time-of-arrival estimate; and the third time-of-arrival estimate.

3. The method of claim 2:

further comprising calculating a multipath metric characteristic of a power ratio between a first-arriving component and subsequent components in the set of multipath components; and wherein characterizing the hybrid time-of-arrival estimate comprises characterizing the hybrid time-of-arrival estimate based on:

the first time-of-arrival estimate;

the second time-of-arrival estimate;

the third time-of-arrival estimate; and the multipath metric.

4. The method of claim 1:

further comprising:

calculating a third time-of-arrival estimate based on a set of multipath components characteristic of the ranging signal;

calculating a multipath value characteristic of a power ratio between a first-arriving component and subsequent components in the set of multipath components; and in response to the multipath value falling below a threshold multipath value, decreasing a second weight, assigned to the second time-of-arrival estimate, relative to a third weight assigned to the third time-of-arrival estimate; and wherein characterizing the hybrid time-of-arrival estimate comprises characterizing the hybrid time-of-arrival estimate based on a weighted combination of:

the first time-of-arrival estimate according to a first weight;

the second time-of-arrival estimate according to the second weight; and the third time-of-arrival estimate according to the third weight.

5. The method of claim 1:

further comprising:

calculating a third time-of-arrival estimate based on a set of multipath components characteristic of the ranging signal;

calculating a multipath value characteristic of a power ratio between a first-arriving component and subsequent components in the set of multipath components; and in response to the multipath value exceeding a threshold multipath value, increasing a second weight, assigned to the second time-of-arrival estimate, relative to a third weight assigned to the third time-of-arrival estimate; and wherein characterizing the hybrid time-of-arrival estimate comprises characterizing the hybrid time-of-arrival estimate based on a weighted combination of:

the first time-of-arrival estimate according to a first weight;

the second time-of-arrival estimate according to the second weight; and the third time-of-arrival estimate according to the third weight.

6. The method of claim 1, wherein calculating the set of phase differences comprises:

identifying a subset of multiplexed sub-signals in the set of multiplexed sub-signals based on a threshold propagation time of the ranging signal; and calculating the set of phase differences of sub-signal pairs in the subset of multiplexed sub-signals.

7. The method of claim 6:

wherein calculating the set of phase differences comprises:

for each sub-signal pair in the subset of multiplexed sub-signals, calculating a sub-signal pair time-of-arrival estimate, in a set of sub-signal pair time-of-arrival estimates, based on a phase difference of the sub-signal pair; and calculating a central tendency metric descriptive of the set of sub-signal pair time-of-arrival estimates; and wherein calculating the second time-of-arrival estimate comprises calculating the second time-of-arrival estimate based on the central tendency metric.

8. The method of claim 1:

further comprising:

calculating a first uncertainty of the first time-of-arrival estimate based a sampling frequency of the receiver; and calculating a second uncertainty of the second time-of-arrival estimate based on a variability measure characteristic of phase differences of sub-signal pairs in the set of multiplexed sub-signals; and wherein characterizing the hybrid time-of-arrival estimate comprises characterizing the hybrid time-of-arrival estimate based on:

the first time-of-arrival estimate;

the second time-of-arrival estimate;

the first uncertainty; and the second uncertainty.

9. The method of claim 8:

further comprising:

calculating a first weight for the first time-of-arrival estimate based on the first uncertainty; and calculating a second weight for the second time-of-arrival estimate based on the second uncertainty; and wherein characterizing the hybrid time-of-arrival estimate comprises calculating the hybrid time-of-arrival estimate based on a weighted combination of:

the first time-of-arrival estimate according to the first weight; and the second time of arrival estimate according to the second weight.

10. The method of claim 1, further comprising calculating a distance between the transmitter and the receiver based on the hybrid time-of-arrival estimate.

11. The method of claim 10, wherein calculating the distance between the transmitter and the receiver comprises:

accessing a time bias between the transmitter and the receiver; and calculating the distance between the transmitter and the receiver based on the hybrid time-of-arrival estimate and the time bias.

12. The method of claim 1:

wherein accessing the ranging signal comprises accessing a set of ranging signals transmitted from a set of transmitters and received at the receiver, the set of ranging signals comprising the ranging signal;

wherein characterizing the hybrid time-of-arrival estimate comprises calculating a set of hybrid time-of-arrival estimates for the set of ranging signals, the set of hybrid time-of-arrival estimates comprising the hybrid time-of-arrival estimate; and further comprising:

calculating a set of distances between the receiver and the set of transmitters; and localizing the receiver relative to the set of transmitters based on the set of distances.

13. A method comprising:

accessing a ranging signal transmitted from a transmitter and received at a receiver, the ranging signal comprising a set of multiplexed sub-signals characterized by a set of frequencies;

generating a time-based representation of the ranging signal;

calculating a first time-of-arrival estimate based on the time-based representation of the ranging signal;

detecting a set of multipath components characteristic of the ranging signal;

calculating a second time-of-arrival estimate based on the set of multipath components; and characterizing a hybrid time-of-arrival estimate based on a combination of the time-based time-of-arrival estimate and the phase-amplitude-based time-of-arrival estimate.

14. The method of claim 13:

further comprising:

calculating a first uncertainty of the first time-of-arrival estimate based a sampling frequency of the receiver; and calculating a multipath metric characteristic of a power ratio between a first-arriving component and subsequent components in the set of multipath components; and wherein characterizing the hybrid time-of-arrival estimate comprises characterizing the hybrid time-of-arrival estimate based on:

the first time-of-arrival estimate;

the second time-of-arrival estimate;

the first uncertainty; and the multipath metric.

15. The method of claim 13:

further comprising:

calculating a multipath value characteristic of a power ratio between a first-arriving component and subsequent components in the set of multipath components; and assigning a first weight, to the first time-of-arrival estimate, relative to a second weight assigned to the second time-of-arrival estimate based on the multipath value; and wherein characterizing the hybrid time-of-arrival estimate comprises characterizing the hybrid time-of-arrival estimate based on a weighted combination of:

the first time-of-arrival estimate according to a first weight; and the second time-of-arrival estimate according to the second weight.

16. The method of claim 13:

further comprising:

calculating a set of phase differences of sub-signal pairs in the set of multiplexed sub-signals; and calculating a third time-of-arrival estimate based on the set of phase differences of sub-signal pairs;

wherein characterizing the hybrid time-of-arrival estimate comprises characterizing the hybrid time-of-arrival estimate based on a combination of:

the first time-of-arrival estimate;

the second time-of-arrival estimate; and the third time-of-arrival estimate; and further comprising calculating a distance between the transmitter and the receiver based on the hybrid time-of-arrival estimate.

17. The method of claim 16, wherein characterizing the hybrid time-of-arrival estimate comprises calculating the hybrid time-of-arrival estimate based on a weighted average of:

the first time-of-arrival estimate;

the second time-of-arrival estimate; and the third time-of-arrival estimate.

18. A method comprising:

accessing a ranging signal transmitted from a transmitter and received at a receiver, the ranging signal comprising a set of multiplexed sub-signals characterized by a set of frequencies;

calculating a set of phase differences for sub-signal pairs in set of multiplexed sub-signals;

calculating a first time-of-arrival estimate based on the set of phase differences of sub-signal pairs;

calculating a second time-of-arrival estimate based on a set of multipath components characteristic of the ranging signal; and characterizing a hybrid time-of-arrival estimate of the ranging signal based on a combination of the first time-of-arrival estimate and the second time-of-arrival estimate.

19. The method of claim 18:

further comprising:

calculating a first uncertainty of the first time-of-arrival estimate based on a distribution associated with the set of phase differences; and calculating a multipath metric characteristic of a power ratio between a first-arriving component and subsequent components in the set of multipath components; and wherein characterizing the hybrid time-of-arrival estimate comprises characterizing the hybrid time-of-arrival estimate based on:

the first time-of-arrival estimate;

the second time-of-arrival estimate;

the first uncertainty; and the multipath metric.

20. The method of claim 18:

further comprising:

calculating a multipath value characteristic of a power ratio between a first-arriving component and subsequent components in the set of multipath components; and assigning a first weight, to the first time-of-arrival estimate, relative to a second weight assigned to the second time-of-arrival estimate based on the multipath value; and wherein characterizing the hybrid time-of-arrival estimate comprises characterizing the hybrid time-of-arrival estimate based on a weighted combination of:
the first time-of-arrival estimate according to a first weight; and
the second time-of-arrival estimate according to the second weight.

* * * * *